April 6, 1937.  A. J. ALLEN ET AL  2,076,491
DETACHABLE METER
Original Filed Jan. 3, 1935   2 Sheets-Sheet 1

WITNESSES:

INVENTORS.
Albert J. Allen and
William M. Bradshaw.
BY
ATTORNEY

April 6, 1937. A. J. ALLEN ET AL 2,076,491
DETACHABLE METER
Original Filed Jan. 3, 1935   2 Sheets-Sheet 2

WITNESSES:
C. J. Weller
Wm. C. Groome

INVENTORS.
Albert J. Allen and
William M. Bradshaw.
BY
ATTORNEY

Patented Apr. 6, 1937

2,076,491

UNITED STATES PATENT OFFICE 2,076,491

DETACHABLE METER

Albert J. Allen, Brooklyn, N. Y., and William M. Bradshaw, Summit, N. J., assignors to Westinghouse Electric & Manufacturing Company, East Pittsburgh, Pa., a corporation of Pennsylvania Application January 3, 1935, Serial No. 234
Renewed February 28, 1936

14 Claims. (Cl. 247—2)

Our invention relates to electrical metering systems and more specifically to an improved method of mounting a plurality of watthour meters for measuring the energy consumption of an apartment-house, office building, or the like.

In buildings containing a number of individual electrical-energy consumers where it is desired to separately measure the energy requirements of each consumer, it is sometimes difficult and inconvenient to mount all of the necessary watthour meters at a centralized point. In some cases, all of the meters are mounted in a separate cabinet, requiring a substantial amount of space and leaving the service and load connections exposed to dust and unauthorized tampering. The conservation of space is usually an important factor and the problem of properly connecting the various meters to their respective circuits is somewhat complicated.

It is an object of the present invention to provide a mounting for a plurality of watthour meters which utilizes a conduit of channel-shape to facilitate the mounting and connection of the meters for service.

It is a further object of the invention to provide a meter mounting wherein individual meters may be readily placed into circuit and taken from the circuit by a thrust movement; the meter itself constituting the electrical connection between the supply and service conductors.

In practicing the invention, a conduit of conventional channel shape is employed having two longitudinally extending compartments. One compartment contains the supply or service lines and the other the branch or load lines to the various circuits to be measured. The open face of the channel is closed by a plurality of apertured overlapping plates, each plate carrying contacts electrically connected respectively with the service conductors and respective load conductors. A watthour meter having contacts projecting from the base thereof in a manner well known in the art is adapted to be secured to each plate with the respective contacts in electrical engagement, by a suitable sealing ring.

Referring to the accompanying drawings.

Figure 2:
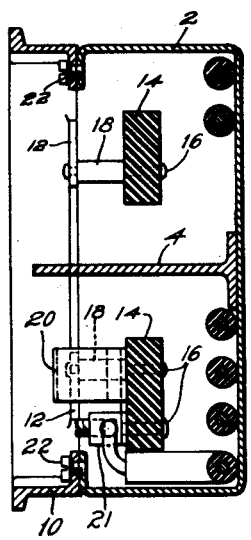
Fig. 2 is a view in vertical section on the line II—II of Fig. 1.
Figure 4:
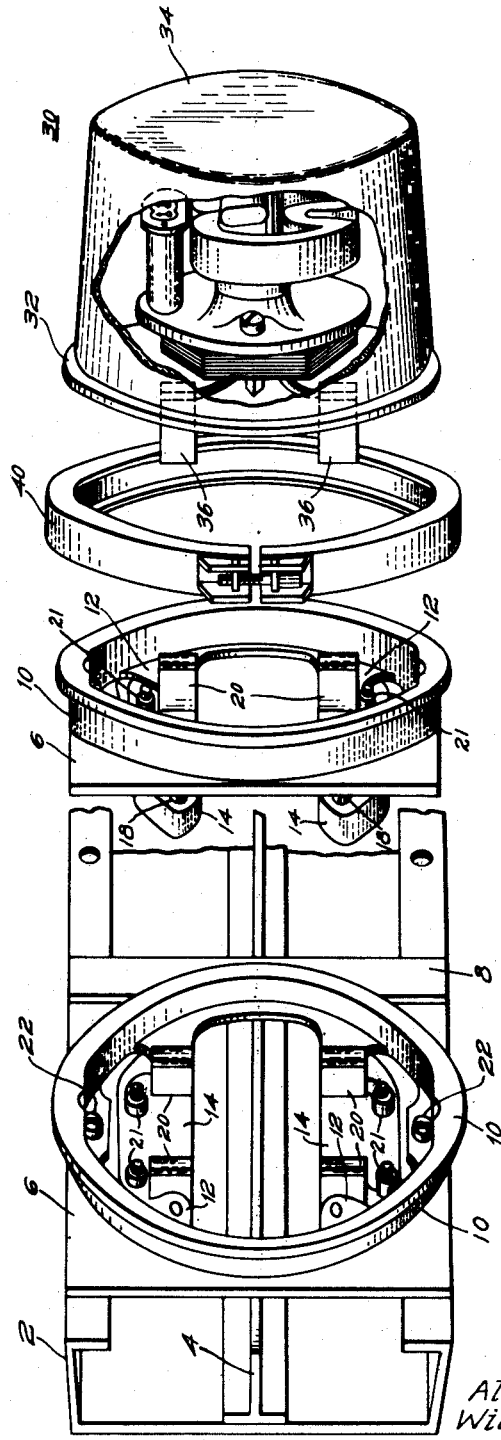

Referring more specifically to the drawings, and particularly to Fig. 4, the invention contemplates a conduit channel 2 having a longitudinally extending partition 4. The upper chamber defined by the partition may be employed to receive the supply or service conductors and the lower channel may house the various load conductors leading to the consumer's translating devices. The disposition of these various conductors is indicated in Fig. 2, it being understood that although only four load conductors are shown, it is contemplated that there will be two conductors for each of the plates 6, as hereinafter set forth.

Figure 3:
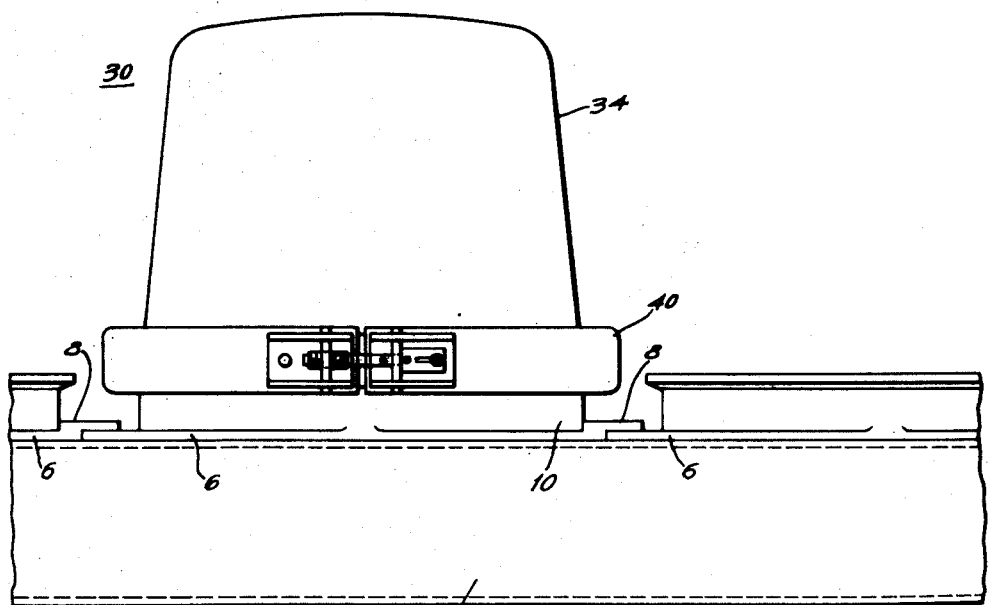
Fig. 3 is an assembly view, in elevation, of a meter mounted in accordance with the present invention; and, Fig. 4 is an "exploded" view in perspective of the various elements constituting the invention.

The open face of the channel is covered by a plurality of square plates 6 having complementary overlapping edges 8, as shown more clearly in Fig. 3 to prevent the entrance of foreign matter into the channel. Any desired number of plates may be employed, depending upon the number of meters used, and the portion of the channel not covered by the plates 6, as well as the open ends of the channel, may be closed in any suitable manner.

Figure 1:
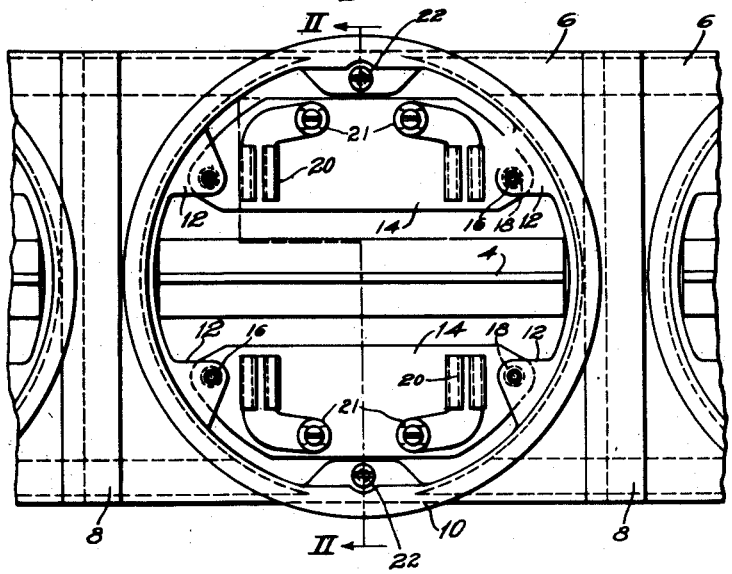
Figure 1 is a view in elevation of a portion of a conduit channel and a plate secured to it in accordance with the present invention.

Each plate 6 is provided with an aperture surrounded by an upstanding flange 10, as shown. Four lugs 12 are provided at the inner base of the flange 10; two being for disposition on each side of the partition 4. From each pair of lugs 12 a plate 14 of insulating material is suspended by means of rivets 16 and suitable spacer elements 18 (Figs. 1 and 2).

Contact jaws 20 are mounted upon the plates 14, each having a terminal screw 21 in the upper chamber of the channel for connection, in parallel, to the supply conductors. The terminal screws 21 in the lower chamber of the channel are connected to the respective load conductors of the circuits to be metered.

The plate 6 with the contacts 20 may be readily removed as a unit and is maintained in position by suitable securing means, such as machine screws 22 cooperating with threaded openings in the in-turned flanges of the channel 2.

A watthour meter 30, referring to Fig. 4, comprising a base plate 32 and a glass cover 34 enclosing the meter mechanism, is provided with knife blade contacts 36 in a manner disclosed in United States Patent No. 1,969,499, issued August 7, 1934 to Bradshaw, et al. This particular meter construction is not claimed per se in this application; the application being limited to the improved means for mounting such meter constructions.

The metal base 32 of the meter is of the same diameter as the upper periphery of the flange 10 on the plate 6, and the meter contacts 36 are disposed to engage the contacts 20 carried by the plate 6. The arrangement is such that when the meter is placed in position with the contacts 20 and 36 in engagement, a circuit is completed from the supply conductors through the meter mechanism to the particular load conductors which are to be metered.

When the meter 30 is in position on the plate 6, a suitable sealing ring 46 engages the adjacent edges of the meter base 32 and the flange 10 of the plate 6, and the usual lead wafer seal and wire may be employed to discourage unauthorized removal of the meter.

It should be obvious from the foregoing that the present invention facilitates the mounting of a plurality of meters in installations such as apartment-houses, office buildings, and the like, and space requirements for such installations are materially less than in the prior practice of individually mounting the meters. The insertion or removal of a particular meter may be effectively employed to connect and disconnect a particular customer's service, and the meters themselves are readily detachable to facilitate inspection, repair and testing. Because the meters are all grouped in one position, periodic reading and inspection is facilitated. When a meter is removed, for any reason, a cover plate may be sealed in position by ring 46, to prevent tampering with the connections in the channel. Unauthorized tampering is further discouraged by reason of the interlocking between the plates 6 afforded by the overlapping edges 8. Referring to Fig. 3, the plate 6 in the center cannot be removed, even though the machine screws 20 are removed, until the plate on its left is removed. In order to remove a plate, and the meter sealed to it, at some intermediate point in the row of meters, it is therefore necessary to remove all of the plates and meters to the left of it, one at a time, starting on the extreme left.

Obviously, many modifications may be made of the structure disclosed, and we desire that no limitations be placed upon the present invention except those imposed by the prior art and specified in the appended claims.

We claim as our invention:

1. In combination with a conduit of channel shape for enclosing supply and load conductors, a partition extending longitudinally of the conduit for separating said supply and load conductors, means for closing said channel comprising a plurality of plate members removably secured to said channel in edge-to-edge interlocking relation and each having contacts electrically connected to said supply conductors and load conductors, respectively, an electrical measuring instrument associated with each plate member and having contacts disposed to cooperate with said plate contacts to measure the energy transmitted between said supply and load conductors, and means for detachably securing said instruments to said plate members, respectively.

2. In combination with a conduit channel containing electrical conductors, a plate proportioned to bridge said channel, an aperture in said plate, contacts carried by said plate registering with said aperture and adapted to be connected to said conductors, means for securing said plate in operative position, an electrical instrument having a base substantially co-extensive in lateral dimensions with said plate aperture and having electrical contacts disposed to engage said plate contacts, and means for detachably securing said instrument to said plate.

3. In combination with a conduit channel containing electrical conductors, a plate proportioned to bridge said channel and means for securing it in position, electrical contacts carried by said plate within said channel for connection, respectively, to certain of said conductors, an aperture in said plate exposing said contacts, an upstanding collar surrounding said aperture having a laterally extending flange at the outer periphery thereof, an electrical instrument having contacts disposed to engage said plate contacts and having a base proportioned to rest upon the laterally extending flange of said plate, and means engaging said flange and said base to secure the instrument in operative position.

4. In combination with a plurality of electric meters each having contact means on the casing thereof, a group mounting for such meters comprising an elongated member of channel-shape having disposed therein service conductors for the circuits to be individually metered and supply conductors common to said meters, a mounting plate for each meter proportioned to bridge said channel member and having an opening therein proportioned to be closed by a meter casing, means for securing said plates in substantially edge-to-edge relation to close a length of said channel member, a plurality of contacts mounted on each of said plates for engagement with the respective meter contacts, certain of the contacts of each plate being electrically connected to said common supply conductors in parallel and others being connected to individual service conductors, and means for securing said meters to said plates in contact engaging position.

5. A meter installation comprising a meter casing having contact means secured thereto, a receptacle for enclosing service and supply conductors for energizing the meter movement within said casing, and having an opening in one side thereof, a closure for said opening comprising a plate having an aperture therein proportioned to be closed by said meter casing, contact means carried by said plate registering with said aperture and disposed to engage said casing contacts when the casing is in position to close said aperture, means for securing said plate to said receptacle and means for securing said meter casing to said plate.

6. A mounting for a meter casing having contact means secured thereto, comprising a support having an opening therein for receiving said contact means, a contact assembly comprising a member having an aperture therein registering with the opening in said support and means for securing it to said support, a plurality of contact means carried by said member disposed to engage the contact means on said meter casing, means for electrically connecting the contact means on said member to an electrical circuit, and means for securing said meter casing to said member with corresponding contact means on said casing and member in engagement.

7. A meter mounting comprising a support having an opening therein, a plurality of contact means and means for mounting them within said opening, a peripheral flange surrounding said opening, an encased meter mechanism having a portion of the casing thereof proportioned to seat on said flange to close said opening, a plurality of contact means on said casing disposed to engage said first mentioned contact means when the casing is seated on the flange in operative position, and means for securing said casing in operative position.

8. An installation for electric meters, of the type having contacts projecting from the base thereof, comprising an elongated channel or trough open at the front from end to end to provide a continuous receptacle for receiving supply and service conductors, a closure for the front of said channel comprising a plurality of plates, means for securing said plates to said channel in substantially edge-to-edge relation, means for preventing access to the interior of said channel between adjacent plates, each of said plates having an aperture therein proportioned to be closed by one of said meters, and means exposed through said apertures for electrically connecting said meter contacts to said supply and service conductors.

9. An installation for electric meters, of the type having contacts projecting from the base thereof, comprising an elongated channel or trough open at the front from end to end to provide a continuous receptacle for receiving supply and service conductors, a closure for the front of said channel comprising a plurality of plates, means for securing said plates to said channel in substantially edge-to-edge relation, means for preventing access to the interior of said channel between adjacent plates, each of said plates having an aperture therein proportioned to be closed by one of said meters, and means exposed through said apertures for electrically connecting said meter contacts to said supply and service conductors; said means including a contact assembly supported by said plate the contacts of which are disposed to engage the meter contacts when the meter is in aperture-closing position.

10. A support for an electrical measuring instrument, of the type which has contacts projecting from the casing thereof for connection to a circuit, comprising a member having an opening therein surrounded by an upstanding rim portion proportioned to receive said instrument casing and surround the contacts projecting therefrom, additional contacts exposed through said opening and means for supporting them in position to engage the casing contacts comprising a bridge extending across said opening and secured to said member adjacent to said rim.

11. A support for an electrical measuring instrument, of the type which has contacts projecting from the casing thereof for connection to a circuit, comprising a member having an opening therein surrounded by an upstanding rim portion proportioned to receive said instrument casing and surround the contacts projecting therefrom, additional contacts exposed through said opening and means for supporting them in position to engage the casing contacts, a block of insulating material to which said additional contacts are secured and means for suspending said block from said member across the opening therein.

12. A mounting for an electrical instrument, of the type having contact blades projecting from a side of the casing thereof, comprising a substantially rectangular receptacle having an open side, a plate for closing such side having an aperture therein, an upstanding flange surrounding said aperture shaped and proportioned to constitute a seat for said instrument casing with the contact blades thereof projecting into said receptacle, means for securing said plate to the receptacle including a securing device accessible only through said aperture.

13. A mounting for an electrical instrument, of the type having contact means secured to the casing thereof, comprising a support having an opening therein proportioned to receive said contact means, a flange surrounding said opening extending normal to the face of the support and then parallel thereto constituting a seat for a portion of the instrument casing in a plane spaced from that of the support, additional contact means and means for supporting them across said opening in position to engage said casing contact means when the instrument is on said seat, and means for securing said instrument to said flange in seated relation.

14. A mounting for an electrical instrument of the type having contacts projecting from the substantially circular base thereof, comprising a socket of ring-shape having outwardly projecting flanges on each edge thereof, one of said flanges constituting a seat for said base and the other for engagement with a support, a block of insulating material and means for supporting it across the opening of said socket on the side of the socket opposite to said flange constituting a seat for said base, contact means supported on said block in a position to engage certain of said instrument contacts, and means for securing said socket to a support.

ALBERT J. ALLEN.
WILLIAM M. BRADSHAW.